G. M. Cole,

Railroad Tank Feeder,

No. 2,566, Reissued Apr. 16, 1867.

Witnesses:
W. Huff
J. W. Coombs

Inventor:
G. M. Cole

N. PETERS, PHOTO-LITHOGRAPHER, WASHINGTON, D. C.

United States Patent Office.

SAMUEL MOSS, OF SAN FRANCISCO, CALIFORNIA, ASSIGNEE OF GILBERT M. COLE.

*Letters Patent No.* 37,152, *dated December* 16, 1862; *reissue No.* 2,566, *dated April* 16, 1867.

IMPROVED METHOD OF OPERATING RAILROAD PUMPS.

The Schedule referred to in these Letters Patent and making part of the same.

TO ALL WHOM IT MAY CONCERN:

Be it known that I, SAMUEL MOSS, of San Francisco, in the county of San Francisco, and State of California, am the owner of certain Letters Patent for a new and improved Mode of Operating Railroad Pumps, granted to GILBERT M. COLE, of Folsom City, in the county of Sacramento, and State of California, on the 16th day of December, 1862; that I deem the said patent inoperative and invalid by reason of a defective specification; and that the following is a full, clear, and exact description thereof, reference being had to the accompanying drawings, and to the letters of reference marked thereon, in which—

Figure 1:
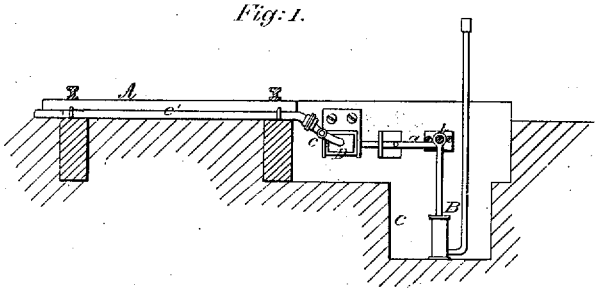

Figure 1 represents a transverse vertical section of my invention; and

Figure 2:
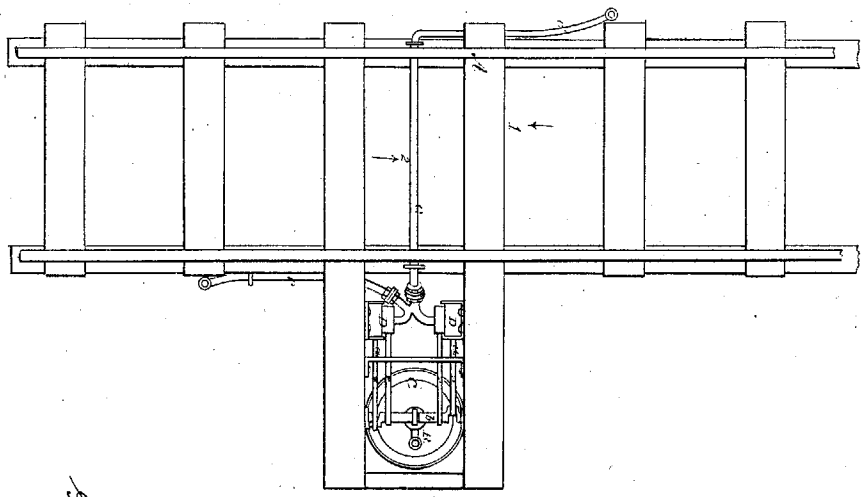

Figure 2, a plan or top view of the same.

Similar letters of reference indicate corresponding parts in both figures.

This invention consists in the application of steam from the locomotive boiler to operate the piston or pistons of one or more steam cylinders which connect by suitable mechanism with the plunger of a railroad pump, in such a manner that whenever the locomotive arrives in the neighborhood of a pump, and when it is desired to throw water into the tender, or into a tank situated at the side of the track, from which it can be let down into the tender, this object is effected by connecting said steam cylinder or cylinders with the locomotive boiler, thereby operating the pump by steam power instead of the ordinary slow process of operating the pump by hand or otherwise.

To enable those skilled in the art to make and use the said invention, I will proceed to describe it with reference to the drawing.

A represents the railroad track in a station or other place in the neighborhood of a pump, B, which serves to throw water into a tank, or directly into the tender, as may be most desirable. Such pumps are generally operated by hand, or sometimes by horse power, or by small stationary steam engines, used in a station for cutting fire-wood, and other similar purposes, and the water is raised into a tank of such capacity that it holds a large supply of water, and placed at such a level that the water from the same runs readily down into the tender. The supply of water is taken from a well, C, and the pump may either be placed down on or near to the bottom of said well, or a double-acting pump may be used and placed above ground, with a suction pipe leading down into the well. Instead of operating the pump by hand, or by some other power which requires some extra attendance and expenditure, one or more steam cylinders, D, which are put up at the side of the track and in the neighborhood of the pump, are employed. The pistons of said cylinders connect by means of rods *a* with a crank-shaft, *b*, through the agency of which motion is imparted to the plunger of the pump. The cylinders D are supplied with steam through pipes *c* or *c'*, which extend on opposite sides of the track, and which are provided with suitable couplings, so that the same can be readily connected with a pipe leading from the boiler of the locomotive. If the locomotive approaches the pump in the direction of arrow 1, fig. 2, the pipe *c* is connected with the boiler, and if the locomotive arrives in the direction of arrow 2, the pipe *c'* is connected with the boiler, and the pipes *c c'* must be so arranged that the steam entering through either of the pipes has access to both cylinders without being permitted to escape through the other pipe. These cranks of the shaft *b*, which connect with the pistons of the cylinders, ought to be placed at an angle of ninety degrees towards each other, so that no fly-wheel is needed to pass the dead-centre. By these means whenever a locomotive arrives in a station or in the neighborhood of the pump, and while the train stops, the boiler of the locomotive is connected with the cylinders D, and the pump is operated. The tender can be supplied with water either directly from the pump, or the water may be raised to a supply tank, from which it is admitted to the tender without requiring any hard labor or extra expense for a horse or other source of power. The particular kind of stationary engine used to pump the water from the well or other fountain to the tender or supply tank, constitutes no part of this invention. I therefore do not limit myself to an engine operated by one or more cylinders and pistons, nor to any particular form of engine; but what I claim as the invention of the said GILBERT M. COLE, and desire to secure by Letters Patent, is—

1. Conducting, by means of connecting pipes, the steam generated in the locomotive boiler to a stationary engine by the roadside, to operate the same, as and for the purpose set forth.

2. The combination of a stationary engine and pump, the connecting pipes *c c'*, and a locomotive boiler, as and for the purpose described.

SAM. MOSS.

Witnesses:

J. J. COOMBS,

JOS. L. COOMBS.